United States Patent
Brewington et al.

(10) Patent No.: US 10,817,735 B2
(45) Date of Patent: Oct. 27, 2020

(54) NEED-SENSITIVE IMAGE AND LOCATION CAPTURE SYSTEM AND METHOD

(71) Applicant: Google LLC, Mountain View, CA (US)

(72) Inventors: Brian Edmond Brewington, Superior, CO (US); Stephane Belmon, Louisville, CO (US); Alexander Cooper, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/482,395

(22) PCT Filed: Jul. 28, 2017

(86) PCT No.: PCT/US2017/044450
§ 371 (c)(1),
(2) Date: Jul. 31, 2019

(87) PCT Pub. No.: WO2019/022774
PCT Pub. Date: Jan. 31, 2019

(65) Prior Publication Data
US 2020/0034638 A1   Jan. 30, 2020

(51) Int. Cl.
*G06K 9/00* (2006.01)
*G01S 17/06* (2006.01)
(Continued)

(52) U.S. Cl.
CPC .......... *G06K 9/00805* (2013.01); *G01S 17/06* (2013.01); *G01S 17/89* (2013.01);
(Continued)

(58) Field of Classification Search
CPC ............... G06K 9/00805; G06K 9/209; G06K 9/00791; H04N 5/2258; G05D 1/0231;
(Continued)

(56) References Cited

U.S. PATENT DOCUMENTS 6,363,161 B2   3/2002   Laumeyer et al.
7,924,323 B2   4/2011   Walker et al.
(Continued)

FOREIGN PATENT DOCUMENTS

CN   103988227 A   8/2014
CN   104575006 A   4/2015
(Continued)

OTHER PUBLICATIONS

Office Action for Korean Patent Application No. 10-2018-7021921 dated Nov. 4, 2019.
(Continued)

*Primary Examiner* — Nam D Pham
(74) *Attorney, Agent, or Firm* — Lerner, David, Littenberg, Krumholz & Mentlik, LLP

(57) ABSTRACT

The disclosure provides for a method of controlling one or more sensors on a moving vehicle that is executable by one or more computing devices. The one or more computing devices may detect a first surface at a first location and a second surface at a second location using the one or more sensors. The second surface may be classified as a target of interest. Then the one or more computing devices may determine one or more timing characteristics of the one or more sensors based on a pose or motion of the one or more sensors relative to the first location of the first surface and the second location of the second surface. Then, the one or more computing devices may control the one or more sensors to capture data according to the determined one or more timing characteristics.

20 Claims, 10 Drawing Sheets

(51) Int. Cl.
- *G01S 17/89* (2020.01)
- *G05D 1/02* (2020.01)
- *H04N 5/225* (2006.01)

(52) U.S. Cl.
CPC ......... *G05D 1/0231* (2013.01); *H04N 5/2258* (2013.01); *G05D 2201/0213* (2013.01); *G06T 2207/30252* (2013.01)

(58) Field of Classification Search
CPC . G05D 2201/0213; G01S 17/89; G01S 17/06; G06T 2207/30252
See application file for complete search history.

(56) References Cited

U.S. PATENT DOCUMENTS

| | | | |
|---|---|---|---|
| 8,885,963 | B2 | 11/2014 | Coleman |
| 9,098,753 | B1 | 8/2015 | Zhu et al. |
| 2009/0299576 | A1* | 12/2009 | Baumann ............ B60R 21/0134 701/45 |
| 2010/0204974 | A1 | 8/2010 | Israelsen et al. |
| 2015/0138324 | A1 | 5/2015 | Shirai |
| 2015/0321607 | A1* | 11/2015 | Cho ........................ B60R 11/04 348/36 |
| 2016/0069691 | A1 | 3/2016 | Fong et al. |
| 2017/0168494 | A1 | 6/2017 | Sibenac et al. |
| 2018/0170373 | A1* | 6/2018 | Kwon .................. B60W 30/09 |

FOREIGN PATENT DOCUMENTS

| | | |
|---|---|---|
| CN | 104778680 A | 7/2015 |
| CN | 105022397 A | 11/2015 |

OTHER PUBLICATIONS

Budvytis et al, Compass-Based Automatic Picture Taking using SenseCam, May 1, 2008, Retrieved from Internet: <https://www.microsoft.com/en-us/research/wp-content/uploads/2016/02/sensecamcompass-pervasive08lbr.pdf>, 4 pages.

Shum et al., A Review of Image-based Rendering Techniques, Jun. 1, 2000. Retrieved from Internet: <https://www.microsoft.com/en-us/research/wp-content/uploads/2016/02/review_image_rendering.pdf>, 12 pages.

Dong et al., Automatic Image Capturing and Processing for PetrolWatch, ICON '11 Proceedings of the 2011 17th IEEE International Conference on Networks. Retrieved from internet: <https://www.cse.unsw.edu.au/~salilk/papers/conferences/ICON2011.pdf>, pp. 236-240.

Hanme Kim, Stefan Leutenegger, and Andrew J. Davison, Real-Time 3D Reconstruction and 6-DoF Tracking with an Event Camera, Sep. 17, 2016, 16 pages.

C. Cadena, L. Carlone, H. Carrillo, Y. Latif, D. Scaramuzza, J. Neira, I. Reid and J.J. Leonard, Past, Present, and Future of Simultaneous Localization and Mapping: Towards the Robust-Perception Age, 2016, 25 pages.

M. Pollefeys, D. Nistér, J.-M. Frahm, A. Akbarzadeh, P. Mordohai, B. Clipp, C. Engels, D. Gallup, S.J-. Kim, P. Merrell, C. Salmi, S. Sinha, B. Talton, L. Wang, Q. Yang, H. Stewénius, R. Yang, G. Welch and H. Towles, Detailed Real-Time Urban 3D Reconstruction From Video, Jul. 2008, 44 pages.

Mateusz Brzeszcz, Toby P. Breckon, Real-Time Construction and Visualisation of Drift-Free Video Mosaics From Unconstrained Camera Motion, Feb. 2, 2015, 12 pages.

International Search Report and Written Opinion dated Mar. 19, 2018, for International Application No. PCT/US2017/044450. 14 pages.

First Office Action for Chinese Patent Application No. 201780011028.7 dated Apr. 29, 2020. 23 pages.

Decision of Rejection for Korean Patent Application No. 10-2018-7021921 dated May 27, 2020. 3 pages.

Decision of Rejection for Korean Patent Application No. 10-2018-7021921 dated Jul. 30, 2020. 3 pages.

English Translation of the First Office Action for Chinese Patent Application No. 201780011028.7 dated Apr. 29, 2020. 27 pages.

Examination Report for European Patent Application No. 17757928.1 dated Apr. 20, 2020. 5 pages.

* cited by examiner

NEED-SENSITIVE IMAGE AND LOCATION CAPTURE SYSTEM AND METHOD

BACKGROUND

Various systems may capture images of different locations. For example, these images may include aerial images, satellite images, street level images, etc. Some of these street level images may provide a panoramic view of a location. Thus, these street level images may provide users with a higher resolution of street-scenes than aerial or satellite views. However, these street level images tend to be more likely to have views of objects that are obstructed by other objects, e.g., views of buildings may be obstructed by static and mobile obstacles such as street-side vegetation, parked vehicles, moving vehicles, pedestrians, cyclists, etc.

Such obstacles may become even more evident when the images are used to generate 3D models of various scenes. For example, trees and vehicles may prevent the images from capturing areas behind these obstacles relative to the camera. Thus, when the images are used to generate a 3D model, the areas behind these obstacles would not necessarily be visible or included in the 3D model. This may make the model appear incomplete to a user viewing the model.

BRIEF SUMMARY

Aspects of the disclosure provide for a method of controlling one or more sensors on a moving vehicle to determine information relating to the surroundings of the vehicle. The method includes using one or more computing devices to identify one or more targets of interest, determine target information using the one or more computing devices, determine one or more timing characteristics for capturing data relating to the one or more targets of interest, and control the one or more sensors to capture data relating to the one or more targets of interest based on the one or more determined timing characteristics. The target information includes information relating to the identified one or more targets of interest, and the one or more timing characteristics being determined based on the target information and a predetermined set of rules relating to information need.

In one example, identifying one or more targets of interest includes identifying first and second targets of interest. Also in this example, determining one or more timing characteristics includes determining a first rate of capture for capturing data relating to the first target of interest and determining a second rate of capture for capturing data relating to the second target of interest. Additionally, capturing data relating to the one or more targets of interest based on the one or more determined timing characteristics includes capturing a first dataset relating to the first target of interest at the first rate of capture and capturing a second dataset relating to the second target of interest at the second rate of capture.

Determining target information also optionally includes determining a first distance from a vehicle location to the first target of interest and determining a second distance from the vehicle location to the second target of interest. In this example, the first rate of capture is determined based on the first distance and the second rate of capture is determined based on the second distance. Furthermore, controlling the one or more sensors to capture data relating to the one or more targets of interest includes controlling a first sensor to capture the first dataset relating to the first target of interest and controlling a second sensor to capture the second dataset relating to the second target of interest.

Determining the first rate of capture optionally also includes determining a first frame rate for capturing the first target of interest, determining the second rate of capture comprises determining a second frame rate for capturing the second target of interest, where the second frame rate is different to the first frame rate. In this example, the first sensor includes a first visual sensor, the second sensor includes a second visual sensor. Additionally, controlling the first sensor to capture the first dataset includes controlling the first visual sensor to capture visual data relating to the first target of interest at the first frame rate, and controlling the second sensor to capture the second dataset includes controlling the second visual sensor to capture visual data relating to the second target of interest, at the second frame rate.

In addition or in the alternative, the first and second targets of interest respectively comprise first and second oppositely-located facades. In another example, determining target information includes determining if an occluder is or will be located between the vehicle and a target of interest, determining one or more timing characteristics for capturing data comprises determining the timing at which data should be captured by a sensor so that at least part of the occluder is not captured by the sensor, and controlling the one or more sensors to capture data comprises controlling the sensor to capture data according to the determined timing. The one or more timing characteristics are also optionally determined based also on the speed of the moving vehicle. In yet another example, the method also includes controlling the one or more computing devices to generate a map or 3D model of captured targets of interest, and determining one or more targets of interest that still need to be captured using the map or 3D model. Additionally or alternatively, the method also includes controlling the one or more computing devices to determine whether data captured by the one or more sensors relates to a target of interest, and discarding at least some data which is determined not to relate to a target of interest.

Other aspects of the disclosure provide for an apparatus configured to carry out the method of any one of the preceding claims.

Further aspects of the disclosure provide for computer-readable instructions which, when executed by computing apparatus, cause the computing apparatus to perform the method of any one of the preceding claims.

Still other aspects of the disclosure also provide for a vehicle including one or more sensors for determining information relating to the surroundings of the vehicle, one or more processors, and a memory comprising computer-readable instructions. The computer-readable instructions, when executed by the one or more processors, cause the one or more processors to obtain target information relating one or more targets of interest, determine one or more timing characteristics for capturing data relating to the one or more targets of interest, and control the one or more sensors to capture data relating to the one or more targets of interest based on the one or more determined timing characteristics. The one or more timing characteristics are determined based on the obtained target information and a predetermined set of rules relating to information need. In one example, the one or more sensors include an image sensor such as a camera. Additionally or alternatively, the one or more sensors include a location sensor such as a LIDAR unit.

In addition, aspects of the disclosure provide for another method of controlling one or more sensors on a moving vehicle. The method includes using one or more computing devices to detect a first surface at a first location and a second surface at a second location using the one or more sensors, classify the second surface as a target of interest, determine one or more timing characteristics of the one or more sensors based on a pose or motion of the one or more sensors relative to the first location of the first surface and the second location of the second surface, and control the one or more sensors to capture data based on the determined one or more timing characteristics.

In one example, determining the timing characteristic comprises determining a first rate of capture for capturing the first surface based on the first location, and determining a second rate of capture for capturing the second surface based on the second location. The second rate of capture is higher than the first rate of capture. In this example, controlling the one or more sensors to capture data includes controlling a first sensor of the one or more sensors to capture a first dataset relating to the first surface at the first rate of capture, and controlling a second sensor of the one or more sensors to capture a second dataset relating to the second surface at the second rate of capture.

In another example, the method also includes controlling the one or more computing devices to classify the first surface as an occluder when the first location is determined to be or will be between a location of the one or more sensors and the second location. Determining one or more timing characteristics for capturing data in this example includes determining one or more trigger locations at which data should be captured by the one or more sensors so that at least part of the occluder is not captured by the one or more sensors, and controlling the one or more sensors to capture data in this example includes controlling the one or more sensors to capture data according to the determined one or more trigger locations.

The one or more timing characteristics are optionally also determined based on a speed of the moving vehicle. In yet another example, the one or more sensors comprise an image sensor. Additionally or alternatively, the one or more sensors include a location sensor configured to capture three-dimensional location data. Furthermore, the method may optionally include controlling the one or more computing devices to determine whether data relating to the target of interest was captured a designated amount of times in the captured data, and send a message indicating more data relating to the target of interest is needed.

Other aspects of the disclosure provide for a system. The system includes one or more sensors for capturing visual data, location data, or both, one or more computing devices, and a memory comprising computer-readable instructions. The computer-readable instructions, when executed by the one or more computing devices, cause the one or more computing devices to detect, using the one or more sensors, a first surface at a first location and a second surface at a second location, classify the second surface as a target of interest, determine one or more timing characteristics of the one or more sensors based on a pose or motion of the one or more sensors relative to the first location of the first surface and the second location of the second surface, and control the one or more sensors to capture data based on the determined one or more timing characteristics.

In one example, the timing characteristic is determined by determining a first rate of capture for capturing the first surface based on the first location, and determining a second rate of capture for capturing the second surface based on the second location. The second rate of capture is higher than the first rate of capture. In this example, a first sensor of the one or more sensors is controlled to capture a first dataset relating to the first surface at the first rate of capture, and a second sensor of the one or more sensors is controlled to capture a second dataset relating to the second surface at the second rate of capture.

In another example, the one or more computing devices are also caused to classify the first surface as an occluder when the first location is determined to be or will be between a location of the one or more sensors and the second location. The one or more timing characteristics for capturing data are determined by determining one or more trigger locations at which data should be captured by the one or more sensors so that at least part of the occluder is not captured by the one or more sensors. The one or more sensors are also controlled to capture data by controlling the one or more sensors to capture data according to the determined one or more trigger locations. In a further example, the one or more sensors are mounted on a vehicle, and the one or more timing characteristics are also determined based on a speed of the vehicle.

The one or more sensors optionally include an image sensor. Additionally or alternatively, the one or more sensors include a location sensor configured to capture three-dimensional location data. In yet another example, the one or more computing devices are also caused to determine whether data relating to the target of interest was captured a designated amount of times in the captured data, and send a message indicating more data relating to the target of interest is needed. The system optionally also includes a vehicle, wherein the one or more sensors are mounted on the vehicle.

Further aspects of the disclosure provide for a non-transitory, tangible computer-readable storage medium on which computer readable instructions of a program are stored. The instructions, when executed by one or more computing devices, cause the one or more computing devices to perform a method. The method includes detecting a first surface at a first location and a second surface at a second location using one or more sensors, classifying the second surface as a target of interest, determining one or more timing characteristics of the one or more sensors based on a pose or motion of the one or more sensors relative to the first location of the first surface and the second location of the second surface, and controlling the one or more sensors to capture databased on the determined one or more timing characteristics.

In one example, determining the timing characteristic includes determining a first rate of capture for capturing the first surface based on the first location, and determining a second rate of capture for capturing the second surface, based on the second location. The second rate of capture is higher than the first rate of capture. In this example, controlling the one or more sensors to capture data includes controlling a first sensor of the one or more sensors to capture a first dataset relating to the first surface at the first rate of capture, and controlling a second sensor of the one or more sensors to capture a second dataset relating to the second surface at the second rate of capture.

In another example, the method also includes classifying the first surface as an occluder when the first location is determined to be or will be between a location of the one or more sensors and the second location. In this example, determining one or more timing characteristics for capturing data includes determining one or more trigger locations at which data should be captured by the one or more sensors so that at least part of the occluder is not captured by the one or more sensors, and controlling the one or more sensors to capture data includes controlling the one or more sensors to capture data according to the determined one or more trigger locations.

The one or more sensors are optionally mounted on a vehicle, and the one or more timing characteristics are also determined based on a speed of the vehicle. In yet another example, the method also includes determining whether data relating to the target of interest was captured a designated amount of times in the captured data, and sending a message indicating more data relating to the target of interest is needed.

DETAILED DESCRIPTION

Overview

Figure 1:
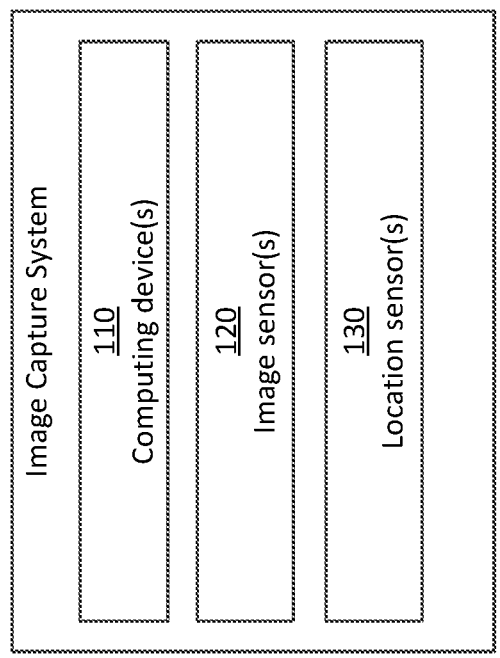
FIG. 1 is a functional diagram of image capture system 100 in accordance with aspects of the disclosure.

The technology relates to a system for capturing the images of objects of interest. By way of example, the system may vary the rate at which a vehicle-mounted image sensor, or visual sensor, captures an image comprising visual data, and a location sensor captures three-dimensional (3D) location data of a surface, or façade, of an object based on the speed of the vehicle and the distance between the image sensor and the surface being captured.

The system may include one or more sensors, including one or more image or locations sensors controlled by one or more computing devices. The image and location sensors may include multiple individual sensors arranged in a rosette pattern or rotating sensors (e.g., a single rotating camera or laser range finder). The sensors may be mounted on a vehicle. Alternatively, the image sensors may be arranged on a gimbal such that they may be steered in x-, y-, and z-directions in space.

The system may detect and classify the surfaces of objects captured by the sensors. For example, a detected surface may be classified as a target of interest using machine learning technology, such as neural networks or deep learning. For instance, the machine learning technology may include a deep neural network (e.g., the technology disclosed in U.S. Pat. No. 9,594,984, which is incorporated herein by reference) that determines whether a surface displays, or is likely to display, text such as a storefront or street sign.

A surface may also be classified as an occluder. For example, if the location sensor indicates that there is a surface between the image sensor and a target of interest (e.g., a stopped car or a tree in front of a storefront), the surface may be classified as an occluder. A surface's classification type may also be determined prior to detection based on previously-collected data or user input.

The system may determine a characteristic of the time at which an image sensor will capture an image or a location sensor will capture a location (hereafter, "timing characteristic"). In some implementations, the timing characteristic may include a rate of capture (e.g., frame rate or refresh rate), an average rate of capture, a phase shift of the rate of capture, and/or one or more trigger locations at which to capture an image. The timing characteristic may be determined based on an image or location sensor's pose or motion, the image or location sensor's pose or motion relative to a target of interest, the presence or absence of a target of interest, and the presence or absence of an occluder. As the properties of one sensor may differ from another, the timing characteristic of one sensor may be different from another sensor.

Based on the determined timing, the system may control one or more image sensors and location sensors in real-time. The system may update the determined timing characteristic continuously, at set intervals, or when a change is detected in the characteristics of pose or motion of a sensor, target of interest, or occluder.

Furthermore, the system may notify the vehicle or a user regarding a sufficiency of captured images and/or locations. In some examples, the vehicle may be an autonomous vehicle. A message indicating that the captured images and locations are sufficient may be sent when 3D location points of the target of interest are captured a sufficient amount, such as two times or more, in the collected images and 3D location points. When the 3D location points of the target of interest are captured an insufficient amount in either the collected images or the 3D location points, such as less than twice, a message indicating that another run by the target of interest is required may be sent. In some examples, the one or more processors may also annotate the 3D location points that were insufficiently captured.

Example Systems

FIG. 1 is a functional diagram of an image capture system 100. Image capture system 100 may have one or more computing devices. The one or more computing devices 110 are configured to accept information, perform operations based on that information, and take an action or provide additional information in response. The one or more computing devices 110 may be, or include, a processor that is capable of receiving one or more electrical signals representing information expressed as a numerical value as input, determine a numerical value based on the input in accordance with instructions, and provide one or more electrical signals that represent the determined numerical value as output. The one or more computing devices 110 may include one or more processors, which may be a commercially available central processing unit (CPU), application-specific integrated circuit (ASIC) or field-programmable gate array. For example, the one or more computing devices 110 may cause the image capture system 100 to move or to capture an image. The one or more computing devices 110 may also control sensor components of the image capture system 100, such one or more image sensors 120, or one or more location sensors 130, individually. Other sensor components of the image capture system may include, for example, radar, air quality sensors, and other types of sensors.

In some examples, the image capture system 100 may include a memory storing data and instructions that may be accessed by the one or more processors and executed by the one or more processors to operate the system, similar to those described below with respect to FIG. 2. Furthermore, the one or more computing devices 110 of image capture system 100 may include one or more components for communicating with other computing devices. By way of example, the one or more computing devices 110 may include circuitry (e.g., a network interface) connecting each device to a different node of communication network, described in more detail below with respect to FIGS. 3 and 4. When the one or more computing devices 110 transmits information to a remote device, the information may be sent over one or more of the Internet (e.g., via core Internet routers in accordance with the Transmission Control Protocol (TCP) and Internet Protocol (IP)), a cellular network (e.g., in accordance with the LTE (Long-Term Evolution) standard), a local network (e.g., an Ethernet or Wi-Fi network), or a Bluetooth connection. A device may provide information to a user via other devices, e.g., device 110 may display information to a user by sending the information via the network to the remote device for display. A computing device may also provide information to another computing device without the use of a network. By way of example, one computing device may output information with a display and another computing device may detect that information with a camera.

The one or more image sensors 120 of image capture system 100 may be configured to capture a photo with a narrow field of view (e.g., captured by a stationary camera with a telephoto lens) or a panoramic image with a wide field of view (e.g., an image captured by a camera with a wide-angle lens or an image stitched together from multiple images taken by a rotating camera or multiple stationary cameras pointed in different directions). A panoramic image may capture a scene 360° in both the horizontal and vertical directions or less than 360° in one or both directions. Further, the one or more image sensors 120 may have a fixed focal length or may have variable focal length. A geographic location of the one or more image sensors 120 at a time of capture of a given image may be associated with the given image, in some cases along with other data, such as timestamp of the time of capture.

The one or more location sensors may be active, such as LiDAR sensors, or passive, such as structure from motion. A LiDAR sensor may include a laser range finder for generating the 3D geometry data. Using the laser range finder, the LiDAR sensor may capture laser data including measurements of the depth at various points to surfaces in the scene. Using information about the LiDAR sensor's location and orientation, these depth measurements may be converted to estimates of 3D location, and interpolated to estimate the location of surfaces that may be visible in an image that was captured by an image sensor at or approximately at the same geographic location as the laser data. In the case of passive location sensors, the location sensors may utilize prior scene knowledge to determine location data. The passive locations sensors may, for example, compare a best estimate of geometry of a geographic area derived from prior scene knowledge with visual features of the geographic area captured by the one or more image sensors.

The one or more image and location sensors may include multiple individual sensors arranged in a rosette pattern or may include rotating sensors, such as a single rotating camera or laser range finder. Other configurations and types of image and location sensors known in the art may also or alternatively be utilized in the image capture system 100.

In some examples, the one or more computing devices 110 may include a machine learning component configured to perform machine learning operations such as neural networking or deep learning techniques. In other examples, the one or more computing devices 110 may be configured to transmit data to a remote system that performs machine learning operations. The one or more computing devices 110 in either case may further be configured to receive results of the machine learning operations of the remote system.

Figure 2:
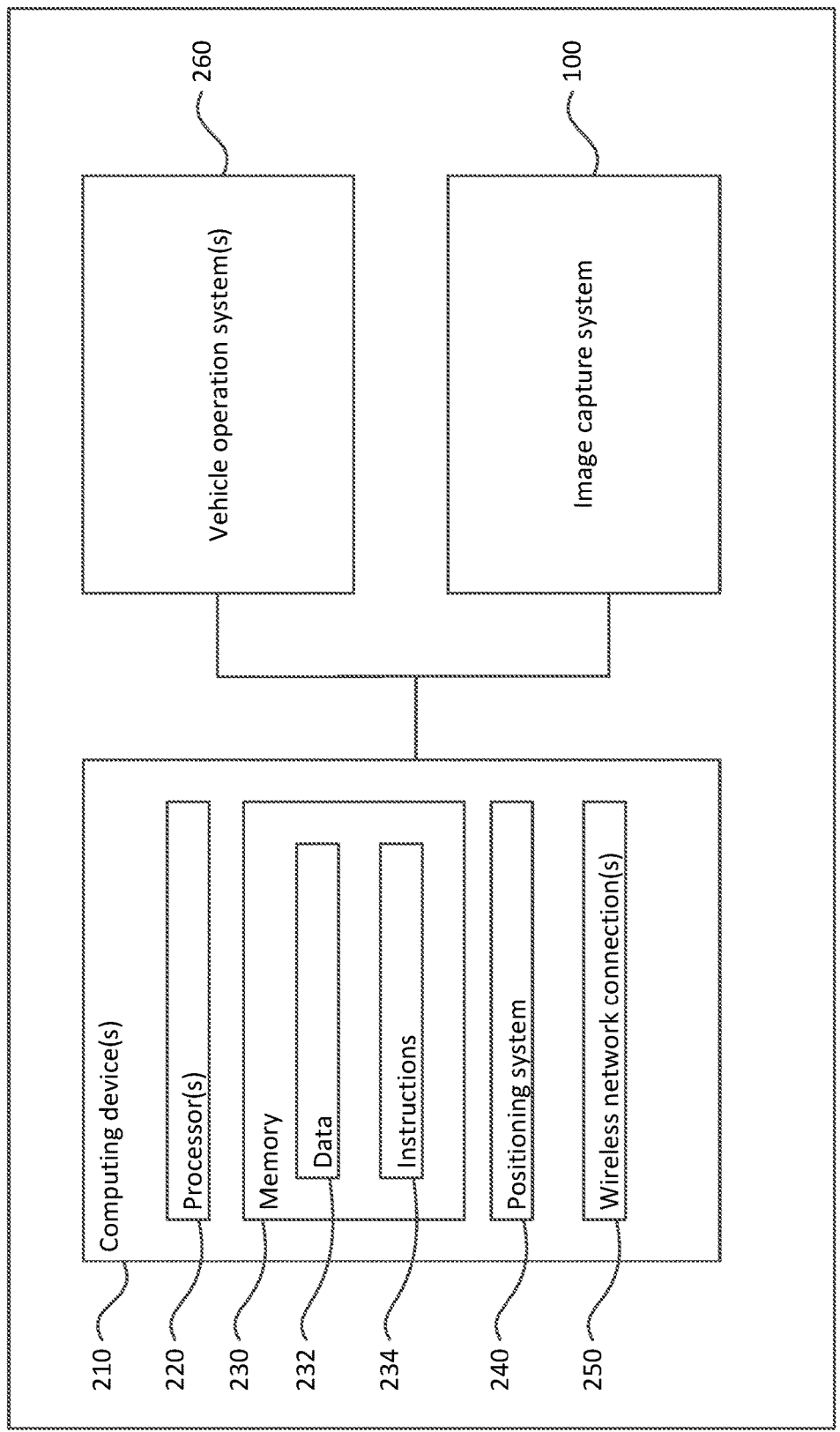
FIG. 2 is a functional diagram of vehicle 200 in accordance with aspects of the disclosure.

As shown in FIG. 2, image capture system 100 may be incorporated into a vehicle 200. The vehicle may be capable of operating autonomously or semi-autonomously. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as one or more computing devices 210 containing one or more processors 220, memory 230 and other components typically present in general purpose computing devices. Image capture system 100 may be connected to the one or more computing devices 210 and mounted onto vehicle 200. The height at which the image capture system 100 may be mounted on vehicle 200 may be any height, but in some cases may be selected to be less than standard vehicle-height limits (e.g., in the United States, 4.2-4.3 meters (13.5-14 feet) above road surface). As the vehicle is driven along a street, the one or more image sensors 120 and the one or more location sensors 130 of image capture system 100 may capture images and location information. In this regard, all or some of the captured images may be considered "street level images." In some examples, the image sensors may also be arranged on a gimbal such that they may be steered in x-, y-, and z-directions in space. Alternatively, the image capture system 100 may be incorporated in an accessory that may be carried by a person, such as a backpack. Images captured using the accessory may also be street level images, such as a photograph of a building captured by a user on a sidewalk or a photograph of a waterfall captured by hiker standing on a footpath.

The one or more computing devices 210 are configured to accept information, perform operations based on that information, and take an action or provide additional information in response. The one or more processors 220 of the one or more computing devices 210 may be capable of receiving one or more electrical signals representing information expressed as a numerical value as input, determine a numerical value based on the input in accordance with instructions, and provide one or more electrical signals that represent the determined numerical value as output. The one or more processors 220 may be a commercially available central processing unit (CPU), application-specific integrated circuit (ASIC) or field-programmable gate array.

The memory 230 stores information accessible by the one or more processors 220, including data 232 and instructions 234 that may be executed or otherwise used by the processor 220. The memory 230 may be any component that is capable of storing information on a non-transitory storage medium that can be read by a computing device, e.g., registers provided by the one or more processors 220, volatile memory such as RAM (random-access memory), non-volatile memory such as flash memory (e.g., a Secure Digital (SD) card), a hard-disk drive, a solid-state drive, optical storage, or tape backups. The one or more computing devices 210, one or more processors 220, and memory 230 are configured so that the one or more computing devices 210 can read, modify, delete and add values stored in memory 230. Memory 230 may be configured to provide restricted access, e.g., the memory may be read-only.

Memory 230 may store information that is used by, or results from, the operations performed by the one or more computing devices 210. By way of example, memory 230 stores data 232, which includes values that are retrieved or stored by the one or more processors 220 in accordance with instructions 234, such as information that is required or determined by the one or more computing devices 210 when performing some of the operations described herein. Values stored in memory 230 may be stored in accordance with one or more data structures. For instance, a value stored in memory 230 may represent a single numeric value (e.g., a binary number, an integer, a floating point number, a Unicode value representing a single character of text, digit or punctuation mark, or a value representing a single machine code instruction), a set of multiple numeric values (e.g., an array of numbers, a string of text characters, XML-formatted data, or a file), or information from which values to be processed in accordance with instructions 234 may be obtained (e.g., a reference to a value stored at a remote location or a parameter of a function from which the required value is calculated). Systems and methods may include different combinations of the foregoing, whereby different portions of the data 232 and instructions 234 are stored on different types of media.

The data 232 may include a target of interest database that identifies surfaces of objects that are classified as targets of interest and the geographic location of each identified surface as well as characteristics that may be associated with targets of interest. Moreover, the data 232 may include an occluder database that identifies surfaces of objects that are known to block targets of interest identified in the target of interest database from a street or other pathway and the geographic location of each identified surface.

The instructions 234 used by the one or more computing devices 210 include any set of one or more instructions that are accessed and executed by the one or more computing devices 210. By way of example, the one or more computing devices 210 stores values representing instructions 234 and the one or more processors 220 is able to access those values and perform, or cause other components of the one or more computing devices 210, vehicle 200, or image capture system 100 to automatically perform, operations associated with those instructions. Instructions 234 may be stored in a format that is capable of execution by the one or more processors 220 with or without additional processing, e.g., machine code, object code, script, or independent source code modules that are interpreted on demand. An operation expressed as a single instruction in one format may correspond with multiple instructions in another format, e.g., executing a single command in script may require the execution of multiple machine code instructions. Some of the operations described herein may involve the execution of instructions provided by an operating system.

Although FIG. 2 functionally illustrates the processor, memory, and other elements of computing device 210 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 210. Accordingly, references to a processor or computing device will be understood to include references to a collection of processors or computing devices or memories that may or may not operate in parallel.

Computing device 210 may also include components for providing information via the physical environment surrounding the device to provide output directly to users. For example, a component may include a positioning system 240. The positioning system 240 may determine the relative or absolute position of the vehicle 200, the one or more image sensors 120, and/or the one or more location sensors 130 on a map or on the Earth when an image or location data is captured. For example, the positioning system 240 may include circuitry, such as a location component and an orientation component, that determines the geographic location and orientation data, respectively, of vehicle 200. By way of example, the location component may include a global navigation satellite system (GNSS), e.g., a GPS (Global Positioning System) receiver that outputs a latitude and longitude coordinate (and potentially altitude) based on satellite signals. The orientation component may include a magnetic compass, accelerometer or gyroscope that are used to determine the pitch, yaw, or roll directions (or any combination thereof) relative to the directions of geographic (or magnetic) north and gravity. Alternatively or in addition, the positioning system 240 may be composed of components that are not primarily directed to determining geographic location or orientation. For instance, the one or more processors 220 may determine the location of the vehicle 200 based on the known geographic locations of cell phone towers or Wi-Fi routers that are detected by a cell phone antenna or Wi-Fi antenna installed on the device. The positioning system 240 may not be physically connected to the one or more processors 220. For example, the one or more processors 220 may determine the location of the vehicle 200 based on the known geographic location of all or a portion of the IP address used by a remote computing devices, such as one described further with respect to FIG. 3, when the remote computing devices is connected to the Internet.

The determined location and orientation data may be associated with the images and location data as they are being captured and stored in memory 230, the storage system 350, other computing devices, or combinations of the foregoing. Although image capture system 100 and positioning system 240 are depicted as separate components within the vehicle 200, these components may or may not be included in the same physical housing. In this regard, the positioning system 240 may be a different device from the image capture system 100 such that both components output the location information, orientation information, and images to the computing device 210, which processes these outputs using the one or more processors 220 in order to associate them with one another and store them in memory 230, the storage system 150, other computing devices, or combinations of the foregoing.

The one or more computing devices 210 may also include one or more components for communicating with other computing devices, such as one or more wireless network connections 250. By way of example, the one or more wireless network connections 250 include circuitry (e.g., a network interface) connecting the one or more computing devices 210 to a different node of communication network 360, shown in FIGS. 3 and 4. Network 360 may be composed of multiple networks using different communication protocols. For instance, when the one or more computing devices 210 transmits information to a remote device in network 360, the information may be sent over one or more of the Internet (e.g., via core Internet routers in accordance with the Transmission Control Protocol (TCP) and Internet Protocol (IP)), a cellular network (e.g., in accordance with the LTE (Long-Term Evolution) standard), a local network (e.g., an Ethernet or Wi-Fi network), or a Bluetooth connection. The one or more computing devices 210 may display information to a user by sending the information via network 360 to the remote device for display. The one or more computing devices 210 may also provide information to another computing device without the use of a network. By way of example, one computing device may output information with a display and another computing device may detect that information with a camera.

In addition to image capture system 100, computing device 210 may also be in communication with one or more vehicle operation systems 260 of vehicle 200. Vehicle operation systems 260 may include systems involved in operations of the vehicle, such as one or more of deceleration, acceleration, steering, signaling, navigation, positioning, detection, etc. Although one or more vehicle operation systems 260 are shown as external to computing device 210, in actuality, the systems may also be incorporated into computing device 210.

Figure 3:
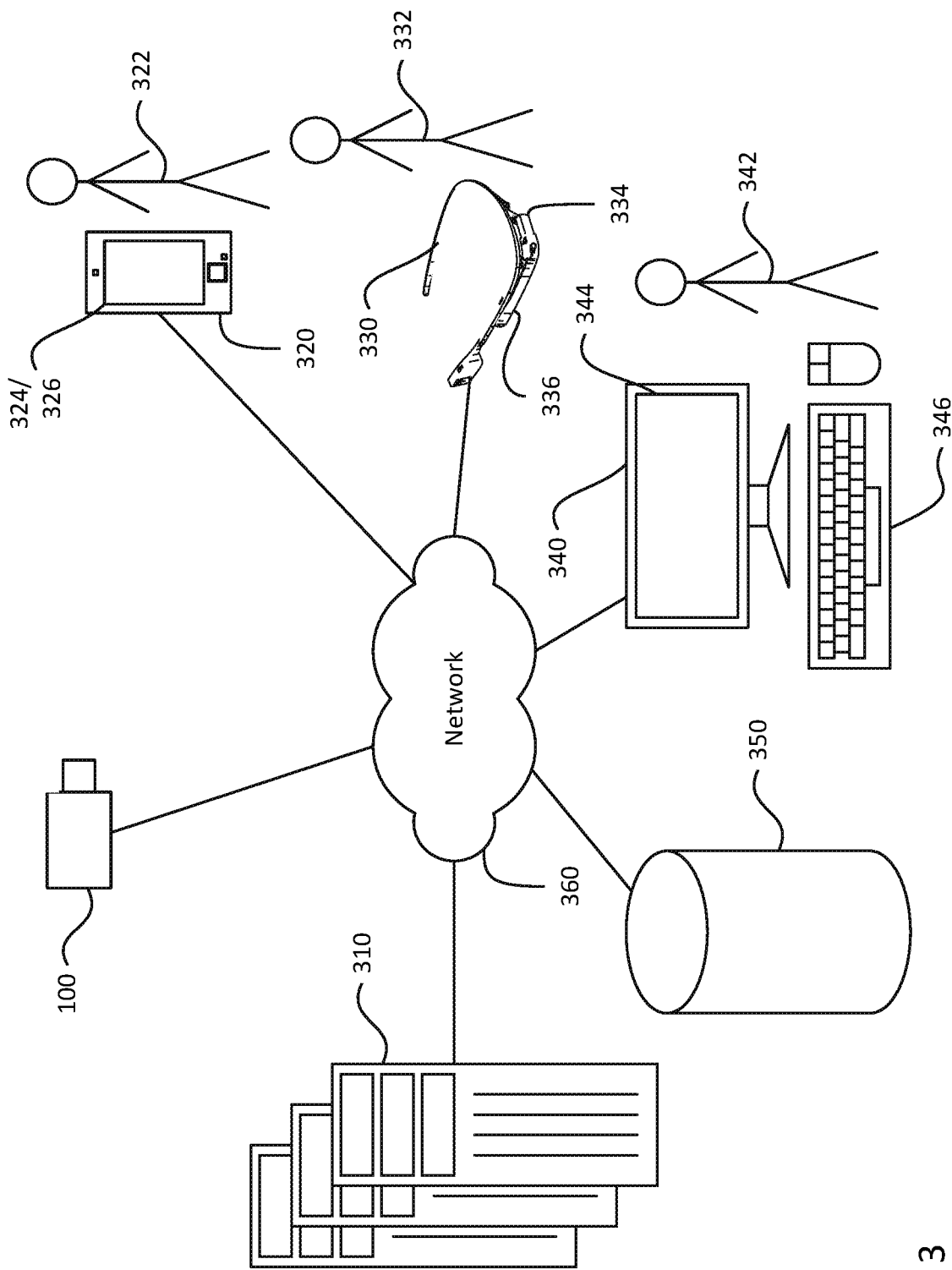
FIG. 3 is a pictorial diagram of a system 300 in accordance with aspects of the disclosure.
Figure 4:
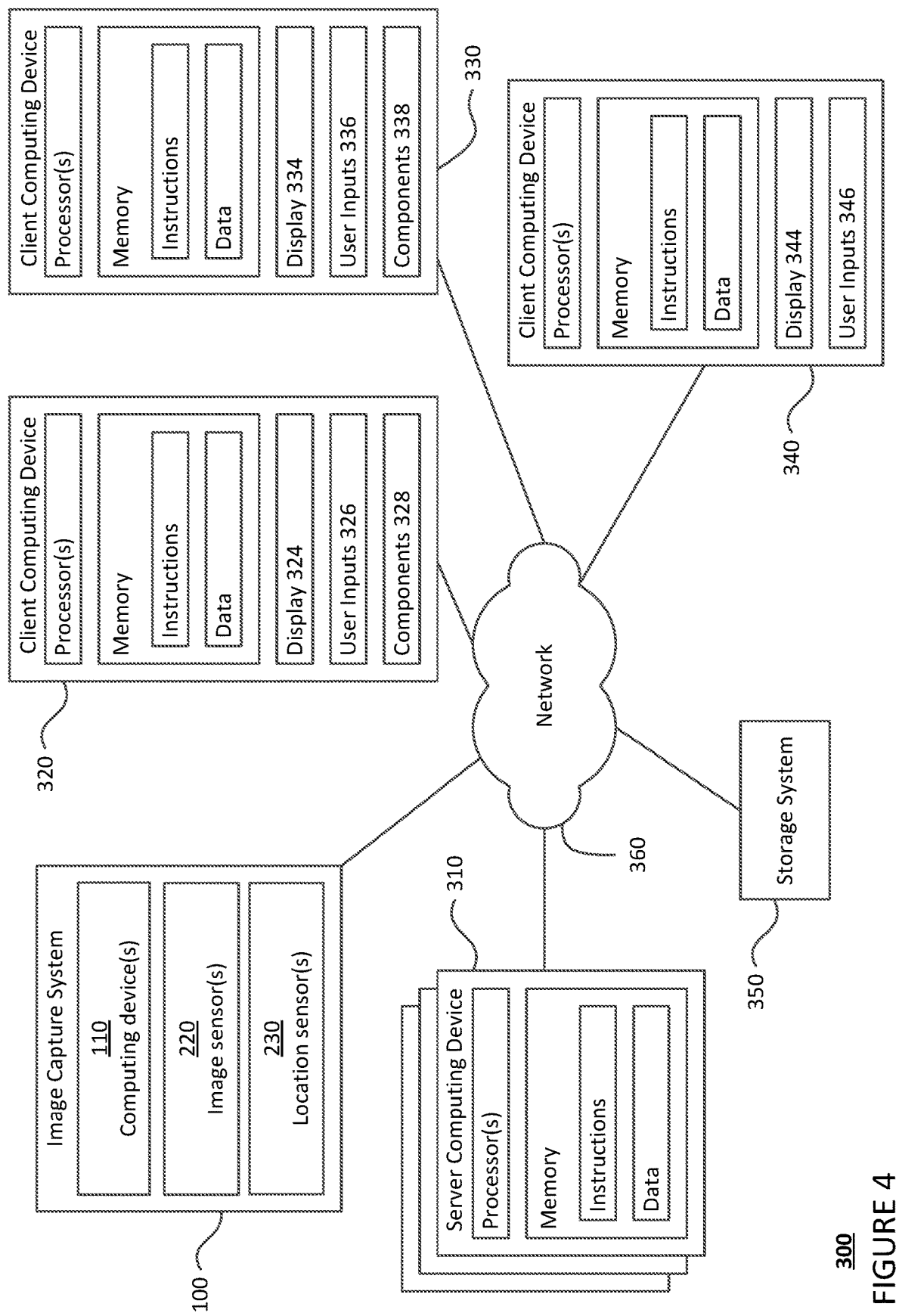
FIG. 4 is a functional diagram of the system 300 in accordance with aspects of the disclosure.

Image capture system 100 may also receive or transfer information, such as captured images, to and from other computing devices. FIGS. 3 and 4 are pictorial and functional diagrams, respectively, of an example system 300 that includes a plurality of computing devices 310, 320, 330, 340 and a storage system 350 connected via a network 360. System 300 also includes image capture system 100. Although only a few computing devices are depicted for simplicity, a typical system may include significantly more. Additionally or alternatively, one or more vehicles such as vehicle 200 may be included in system 300.

As shown in FIG. 3, device 310 may be a server computing device and devices 320, 330, 340 may be client computing devices intended for use by a user 322, 332, 342. For instance, the server computing device 310 may be a web server and the client computing device 320 may be a wireless phone with a touchscreen that functions as both display 324 and user input component 326. The client computing device 330 may be a wearable computing system, shown as a head-mounted computing system, including display 334, such as a near-eye display, and user input component 336, such as a small keyboard, a keypad, a touch screen, a microphone, or a camera on the wearable computing system. The client computing device 340 may be a desktop computer system, including display 344, such as an external monitor connected to the personal computer by a cable, and user input component 346, such as an external keyboard that communicates with the computer via Bluetooth.

It should be understood that other client devices, displays, and user input components or other configurations of such may be utilized in system 300. Other client devices may include, by way of example, laptops, notebooks, netbooks, tablets, set-top boxes (e.g., a cable-television set-top box connected to a television), and wearable devices (e.g., a smartwatch). In that regard, a computing device may include other types of components that are typically present in such devices or general purpose computers but are not expressly described herein.

As shown in FIG. 4, each of computing devices 310, 320, 330, 340 may include one or more processors, memory, data and instructions. Such processors, memories, data and instructions may be configured similarly to one or more processors 220, memory 230, data 232, and instructions 234 of computing device 210 as described above.

In addition, the client computing devices 320 and 330 may also include geographic pose components 328 and 338 for determining the geographic location and orientation of client computing devices 320, 330. For example, these components may include a location component and an orientation component, such as those described above with respect to the positioning system 240 of vehicle 200.

Storage system 350 may store various types of information that may be retrieved or otherwise accessed by a server computing device, such as one or more server computing devices 310, in order to perform some or all of the features described herein. As with memory 230, storage system 350 can be of any type of computerized storage capable of storing information accessible by the server computing devices 310, such as a hard-drive, memory card, ROM, RAM, DVD, CD-ROM, write-capable, and read-only memories. In addition, storage system 350 may include a distributed storage system where data is stored on a plurality of different storage devices which may be physically located at the same or different geographic locations. Storage system 350 may be connected to the computing devices via the network 360 as shown in FIG. 3 and/or may be directly connected to or incorporated into any of the computing devices 310, 320, 330, 340, image capture system 100, etc.

The storage system 350 may store images captured by image capture system 100. Information associated with images such as location information and pose information may be stored in association with the images. Geographic locations may be stored or processed with respect to one or more local or global frames of reference, such as latitude/longitude/altitude coordinates, street addresses, street intersections, an x-y coordinate with respect to the edges of a map (such as a pixel position), lot and block numbers on survey maps, true north, magnetic north, or information from which a geographic location or orientation may be derived (e.g., the name of a building having a known location). A geographic location may be a precise point (a precise latitude/longitude/altitude coordinate) or a range (e.g., by the latitude/longitude locations of a city's borders). Geographic orientations may also be stored or processed with respect to one or more frames of reference (relative to true north, magnetic north or gravity) and may be a precise direction (30° west of true north, 20° above the horizon) or a range (between 45° and 90° west of north). Geographic locations and orientations may be absolute (e.g., relative to a fixed spot or direction on the earth such as a latitude/longitude/altitude coordinate or compass direction relative to true north) or relative (e.g., a distance or compass direction from a mobile device). The storage system 350 may translate locations from one frame of reference system to another. For example, a geocoder routine may be used to convert a location stored as a street address into a latitude/longitude coordinate. In some implementations, one of the one or more computing devices 110, 210, 310, 320, 330, 330 may process the geographic location prior to transmitting the geographic location for storage in the storage system 350.

The storage system 350 may process data that is not a geographic location per se, but is related to a geographic location (hereafter, "geographically-located"). For instance, the storage system 350 may store data relating to one or more points-of-interest (POI) which, for the purposes of the technology described herein, means a place of potential interest to a user. By way of example, the system may store the geographic location of a building, business (e.g., restaurant), road, footpath, monument, lake, park, neighborhood, city or state. The storage system 350 may store information that is related to a POI, such as one or more identifiers (e.g., a name such as "John's Café" or a unique identifier (UID)), categories (e.g., "restaurant"), related POI (e.g., the POI identifier of a mall in which it is located), the owners, or the hours and days of week it is open.

As discussed above, the network 360, and intervening nodes, may include various configurations and protocols including short range communication protocols such as Internet (e.g., via core Internet routers in accordance with the Transmission Control Protocol (TCP) and Internet Protocol (IP)), a cellular network (e.g., in accordance with the LTE (Long-Term Evolution) standard), a local network (e.g., an Ethernet or Wi-Fi network), or a Bluetooth connection, and various combinations of the foregoing. Such communication may be facilitated by any device capable of transmitting data to and from other computing devices, such as modems and wireless interfaces.

Example Methods

In operation, the system may determine one or more timing characteristics for collecting image and/or location data and control the image and/or location sensors accordingly, as described in detail below.

Figure 5:
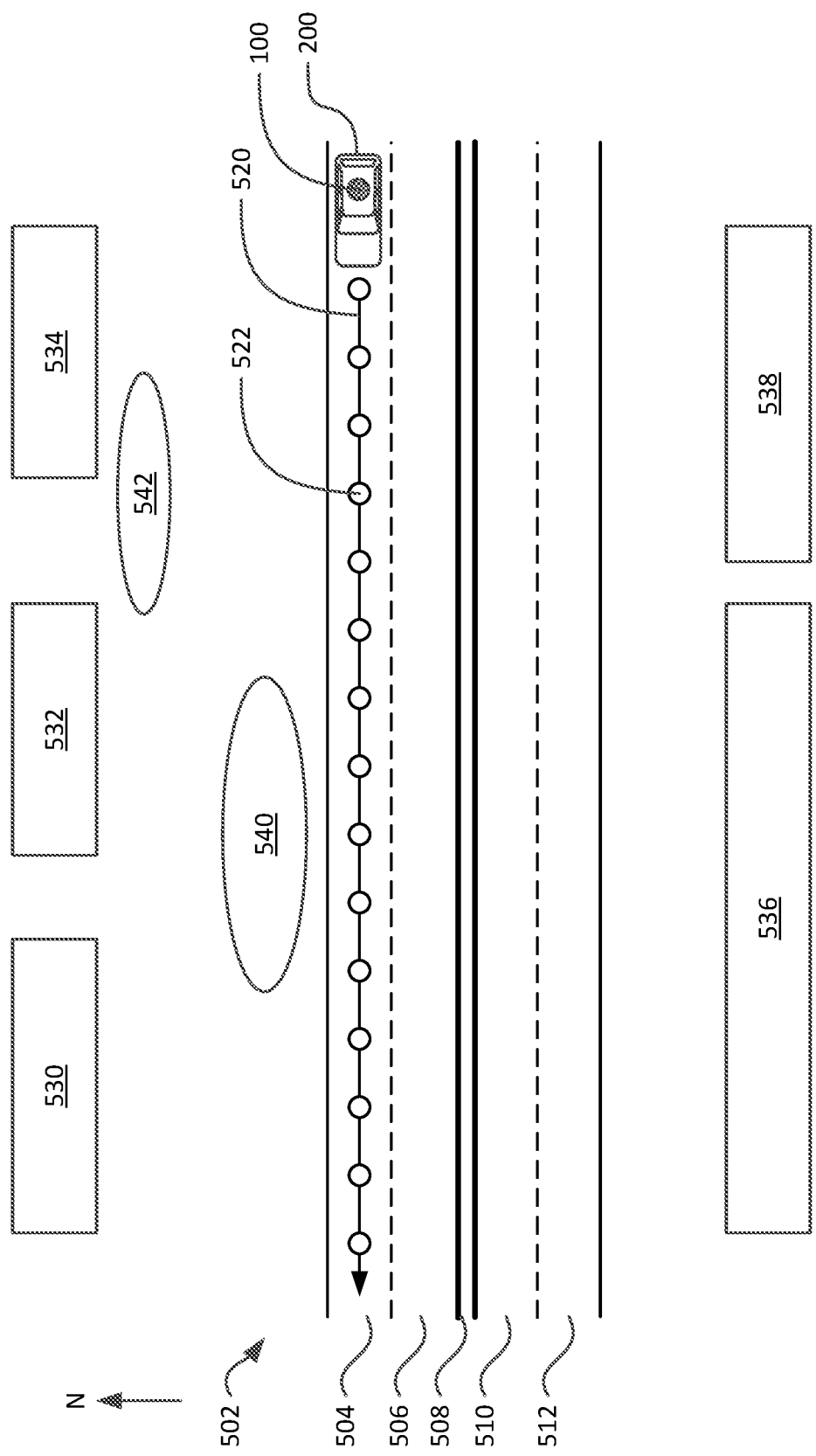
FIG. 5 is an aerial view of a geographic area 500 in accordance with aspects of the disclosure.

As shown in FIG. 5, vehicle 200 may drive through a geographic area 500. FIG. 5 is a birds-eye view of the geographic area 500, including a portion of a street 502 including four lanes 504, 506, 510, and 512. The lanes are divided into two sections by double lane lines 508. Lanes 504 and 506, which appear above double lane lines 508 are westbound lanes, while lanes 510 and 512 below are eastbound. Along the street 502 may be buildings 530-538 as well as other objects such as trees 540 and 542. In this example, the circles of set 520 correspond to the capture locations (x, y) at which images or location data may be captured by image capture system 100 when vehicle 200 travels at a constant speed, such as at or around 25 miles per hour, and the rate of capture or refresh rate is set at a given rate, such as at or around 1 Hz. The distance between each capture location in set 520 in this example may therefore be approximately 30-40 feet. These images or location data may be stored in the memory 230 or the storage system 350 and retrieved by the one or more computing devices, such as the computing devices 110, as needed.

The one or more computing devices 110 of image capture system 100 may be configured to detect surfaces of objects captured by the one or more image or location sensors. In the example shown in FIG. 5, when vehicle 200 reaches location 522, a first image sensor of the one or more image sensors 120 may capture image 600, depicted in FIG. 6. The orientation of the first image sensor may be to the right of the car and parallel to the street, therefore image 600 captures a street view level of the northern side of street 502. In image 600, tree 542 and partial views of buildings 532 and 534 and tree 540 are captured. The one or more computing devices 110 and sensors may detect the surfaces of buildings 532 and 534, trees 540 and 542 and determine an estimated geographic location for each detected surface. For instance, the location of each surface may be based on the geographic location associated with the image 600 and information from a LIDAR sensor. In some cases, the estimated geographic location may be determined based on information related to the detected surface, such as an address detected through optical character recognition or based on location data associated with the detected object and/or image 600.

The surfaces of objects detected in the captured image or location data may be identified as one or more targets of interest by the one or more computing devices 110. For example, objects detected in a captured image may have characteristics that are associated with targets of interest. By way of further example, one or more visual characteristics of a detected object captured by the image sensor, or one or more location characteristics of a detected object captured by the location sensor, may match visual or location characteristics stored in a target of interest database. A target of interest may also be explicitly identified as such in a target of interest database. For instance, an object at a specific geographic location may have been previously determined to be a target of interest. The one or more computing devices 110 may determine that a detected object is a target of interest by determining whether a geographic location of the detected object that was calculated based on the location sensors and the location of vehicle 200 corresponds with the geographic location of a target of interest stored in the target of interest database.

The one or more computing devices 110 may determine a value related to the extent to which a surface corresponds with the characteristics of a target of interest (an "interest value"). The interest value may be determined before, during or after the surface is sensed. By way of example, a user may request a model of any object located at a certain geographic location, in which case the visual and location information of all surfaces that are subsequently sensed at the location may be stored in a database and associated with a flag identifying the surfaces as a target of interest. By way of further example, after the surfaces are sensed, the one or more computing devices 110 may use the sensed visual and shape information to calculate a score related to the likelihood of a surface being a target of interest using a machine learning component. For instance, the machine learning component may be trained by a user to recognize shapes and visual characteristics that correspond with a storefront or street sign. The system may also categorize a surface as a target of interest in real-time, e.g., a computing device installed on vehicle 200 may identify any flat vertical surface as a target of interest because of the likelihood of the surface corresponding with a manmade object. The interest value may also be determined based on a combination of a surface's visual or location-based characteristics, e.g., based on a combination of its visual appearance, its shape and its proximity to a given geographic location. A surface may be classified as target of interest based on its interest value, such as whether the interest value exceeds a threshold. The one or more computing devices 110 may determine a value related to the extent to which a surface corresponds with the characteristics of an occluder (an "occluder value"). For example, if the image or location sensor indicates that there is a surface between the image sensor and a target of interest, the surface may be flagged in a database as an occluder. As shown in image 600, the surface of building 532, which for purposes of illustration has been identified by the system as a target of interest, is partially blocked, or occluded, by trees 540 and 542. The one or more computing devices 110 may determine that the trees 540 and 542 are occluders of the identified target of interest based on the occlusion detected in image 600. In other examples, a location sensor may detect the locations of the surfaces of building 532 and trees 540 and 542, and the one or more computing devices 110 may determine that the location of the surfaces of trees 540 and 542 are located between the surface of building 532, the target of interest, and the street 502 on which vehicle 200 is traveling. The one or more computing devices 110 may determine that the trees 540 and 542 are occluders based on location data detected by the location sensor. In alternative examples, occluders may be previously identified in a database that identifies surfaces that are known to block targets of interest identified in the target of interest database from a street or other pathway. A surface may be classified as an occluder when it blocks any portion of a target of interest, or when the extent to which it blocks a target of interest exceeds a threshold.

The one or more computing devices 110 may determine a characteristic of the time at which an image or location sensor has captured or is likely to capture an image or location data ("timing characteristic"). The timing characteristic may relate to rate of capture (e.g., the time between the capture of one image or set of data and the capture of the next image or set of data, or an average rate of capture over many images) or a phase shift of the rate of capture. The timing characteristic may correspond with trigger locations from which to capture a surface, e.g., as explained in more detail below, the one or more computing devices 110 may determine the moment in time at which the image sensor on a moving vehicle is expected to correspond with a specific geographic location.

The timing characteristics may depend on a variety of factors. For example, a typical rate of capture for an image sensor mounted on a vehicle may be on the order of magnitude of 1 Hz. However, depending on the speed of the car or transportation means on which the image sensor is mounted, and the distance from targets of interest, the rate of capture may be on a greater or smaller order of magnitude, as further discussed below.

The one or more computing devices 110 may determine the timing characteristic based on a pose or motion of an image or location sensor of the image capture system. When the image capture system 100 is mounted on vehicle 200, the pose or motion of the image or location sensor may be determined based on the pose or motion of the vehicle 200. The pose or motion of the vehicle 200 may be determined based on positioning system 164. The pose or motion of the vehicle 200 may also be determined based on information provided by the one or more image sensors 120, the one or more location sensors 130, or other components on or off the vehicle. In some embodiments, the one or more image sensors and the one or more location sensors may also move independently, such as on a gimbal, in which case the pose or motion of each sensor may be determined based also on the pose and motion of each sensor relative to the vehicle.

Returning to FIG. 5, in the example of image capture system 100 mounted on vehicle 200, the first image sensor may be configured to point directly to the right of vehicle 200, and a second image sensor may be configured to point directly to the left of vehicle 200. As depicted in FIG. 5, vehicle 200 may be travelling on the northernmost lane 504 of street 502. Objects along the northern side of the street 502 are on average closer to vehicle 200 and the one or more image or location sensors than objects on the other side of the street 502 and therefore have a greater angular velocity. As such, the rate of capture of a first image sensor on vehicle 200 attempting to capture the surface of building 532 may be faster than the rate of capture of a second image sensor on a car in lane 512 in order to capture the more rapidly changing view to the right of the vehicle 200. The ratio between the rate of capture of the first image sensor and that of the second image sensor may be the inverse of the ratio between the average distance from the vehicle 200 of objects on the right of the vehicle and that of objects on the left of the vehicle. For example, if the ratio of average distances is 1:2, then the ratio of the rate of capture may be 2:1. Other ratios or calculations may be used to determine the difference between the first and second image sensors.

In addition, the rate of capture of a given image or location sensor may increase or decrease as the speed of the vehicle increases or decreases, respectively. The preferred capture locations of set 520 may remain approximately 30-40 feet apart regardless of whether the vehicle increases or decreases in speed. The one or more computing devices 110 may increase the rate of capture when the vehicle's speed increases, and decrease the rate of capture when the vehicle's speed decreases.

The timing characteristic may be determined based on the pose or motion of the image or location sensor relative to the target of interest. For instance, the timing characteristic may be determined based on one or more of the location, orientation, speed or acceleration of the vehicle relative to the location or orientation of a target of interest. By way of further example, the image capture system 100 may determine a rate of image capture such that the amount of overlap between two sequential images of a target of interest exceeds a threshold. For example, based on an angle of view of the first image sensor of the one or more image sensors 120 and an average distance of the target of interest from the first image sensor, one or more capture locations may be determined that would allow an at least 50% overlap between images of the target of interest. Using the one or more capture locations, a rate of capture may be determined for the vehicle according to the speed of the vehicle.

Figure 7:
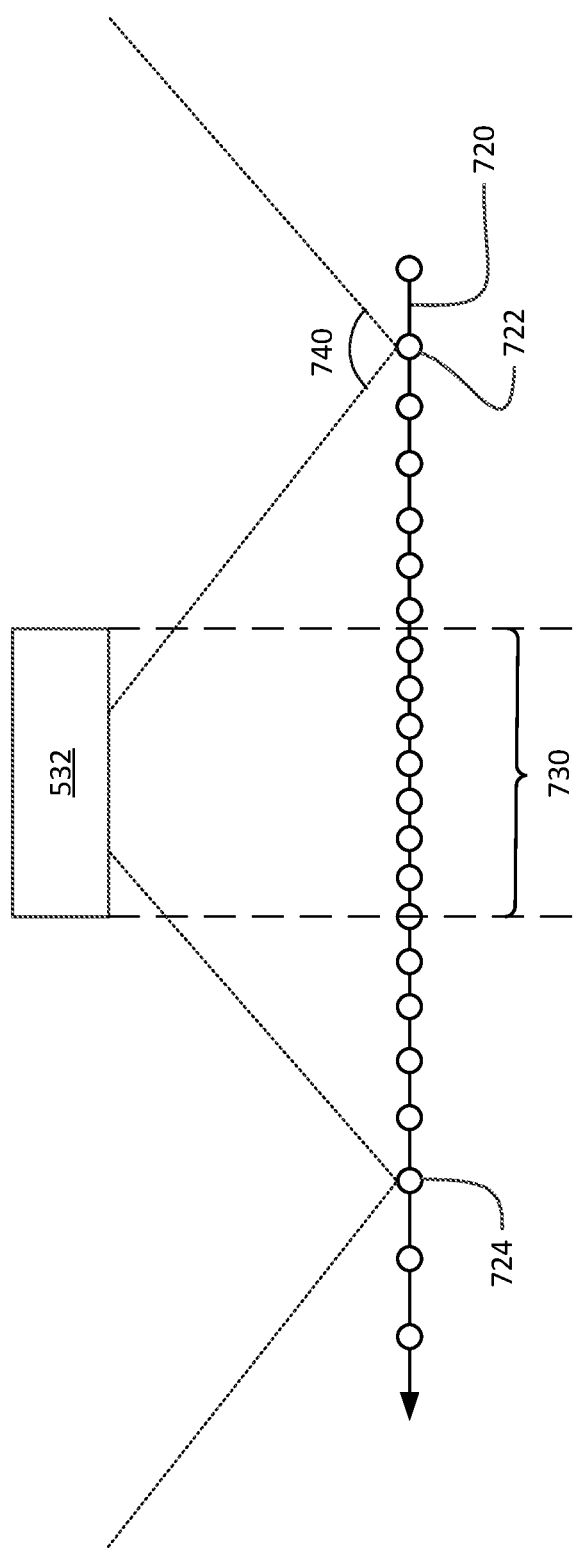
FIG. 7 is an aerial view of a portion of the geographic area 500 in accordance with aspects of the disclosure.

By way of example, the closer or farther an object is to a sensor, the more the image capture system 100 may respectively increase or decrease the sensor's rate of capture. As shown in FIG. 7, as the path along which the vehicle 200 is traveling gets closer to the target of interest, surface of building 532, the rate of capture of an image or location sensor may increase, as evidenced by the capture locations of set 720 being more dense in front of building 532 in area 730 than at an angle to the front of building 532.

The rate of capture of the image or location sensor may increase when a portion of the target of interest is determined to appear within a captured image and decrease when no portion of the target of interest appears in a captured image. The one or more computing devices 110 of image capture system 100 may determine whether a portion of a target of interest appears, or when or where a target of interest is expected to appear, within a field of view of captured image data by first creating or accessing a 3D model of the geographic area including the target of interest, such as geographic area 500 including building 532, and a current location of the vehicle. The one or more computing devices 110 may then project a frame from a current or future position of the sensor in a direction the sensor is or will be facing based on the angle of view of the image or location sensor, and determine a position of the sensor where the projected frame intersects with one or more 3D points associated with the target of interest. For example, the first image sensor of the one or more image sensors 120 may have an angle of view of 740, and may therefore capture at least a portion of the surface of building 532 starting from capture location 722 and ending at capture location 724. Assuming vehicle 200 is traveling at a constant speed, the rate of capture of the first image sensor may begin to increase starting from the capture location 722, reach its highest rate in front of the building 532, and slowly decrease until location 724, after which the rate of capture returns to a constant rate.

The one or more computing devices 110 of image capture system 100 may also determine the timing characteristic based on an image or location sensor's pose or motion relative to an occluder. For instance, the system may determine a trigger location that avoids capturing an occluder in front of the target of interest when collecting images or location data of the target of interest. A first trigger location may be determined to be located immediately before one side of an occluder enters the sensor's field of view and a second trigger location immediately after the other side of the occluder leaves the sensor's field of view. The first and second trigger locations may be locations at which the image capture system 100 is configured to capture a first image and a second image, respectively, or first location data and second location data, respectively. When captured in this way, portions of the first image and the second image, or first location data and second location data, may be combined to form a reconstructed image of the target of interest. Additional trigger locations between the first and second trigger locations may be determined when other portions of the target of interest may be viewed between the first and second trigger locations. Trigger locations may be determined based on an angle of view of a given sensor and a pose of the given sensor. As such, trigger locations may be different for different sensors and may allow the target of interest to be captured at different angles.

Figure 6:
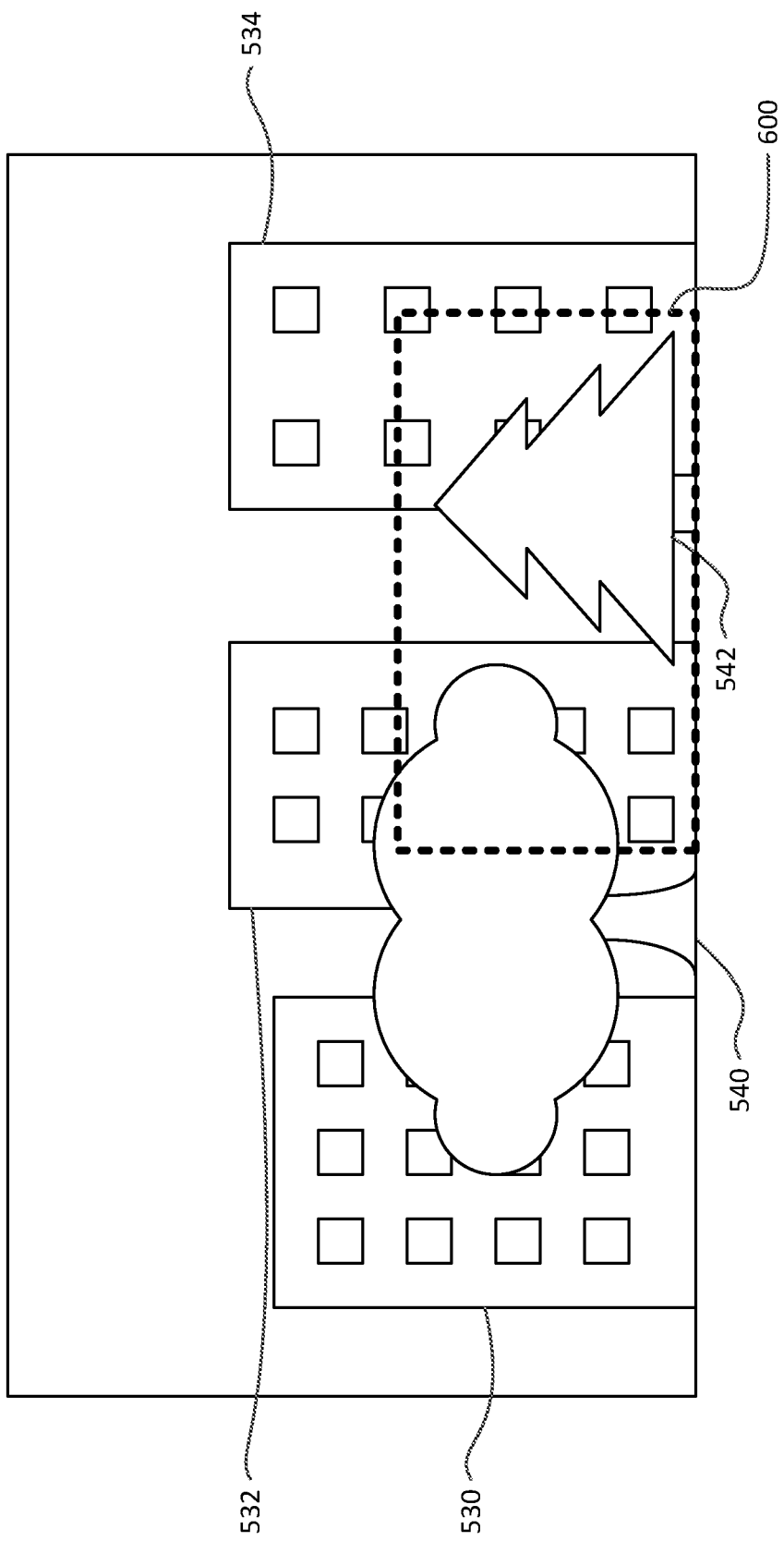
FIG. 6 is a street level view perspective of a portion of the geographic area 500 in accordance with aspects of the disclosure.

For instance, because tree 540 is in front of the surface of building 532, which is identified as a target of interest, an image captured when the image sensor is at a reference street location 810 directly in front of the building 532 may be mostly of the occluding tree 540, as shown image 600 of FIG. 6. A first trigger location 822 may therefore be determined to be a distance up the street 502 from the reference street location 810, such as several yards up the street. When the image sensor is at the first trigger location 822, a first image may be captured by the first image sensor. A second trigger location 824 may be determined to be a distance down the street from the reference street location 810, such as several yards down the street 502. When the image sensor reaches the second trigger location 824, a second image may be captured by the first image sensor.

Figure 8:
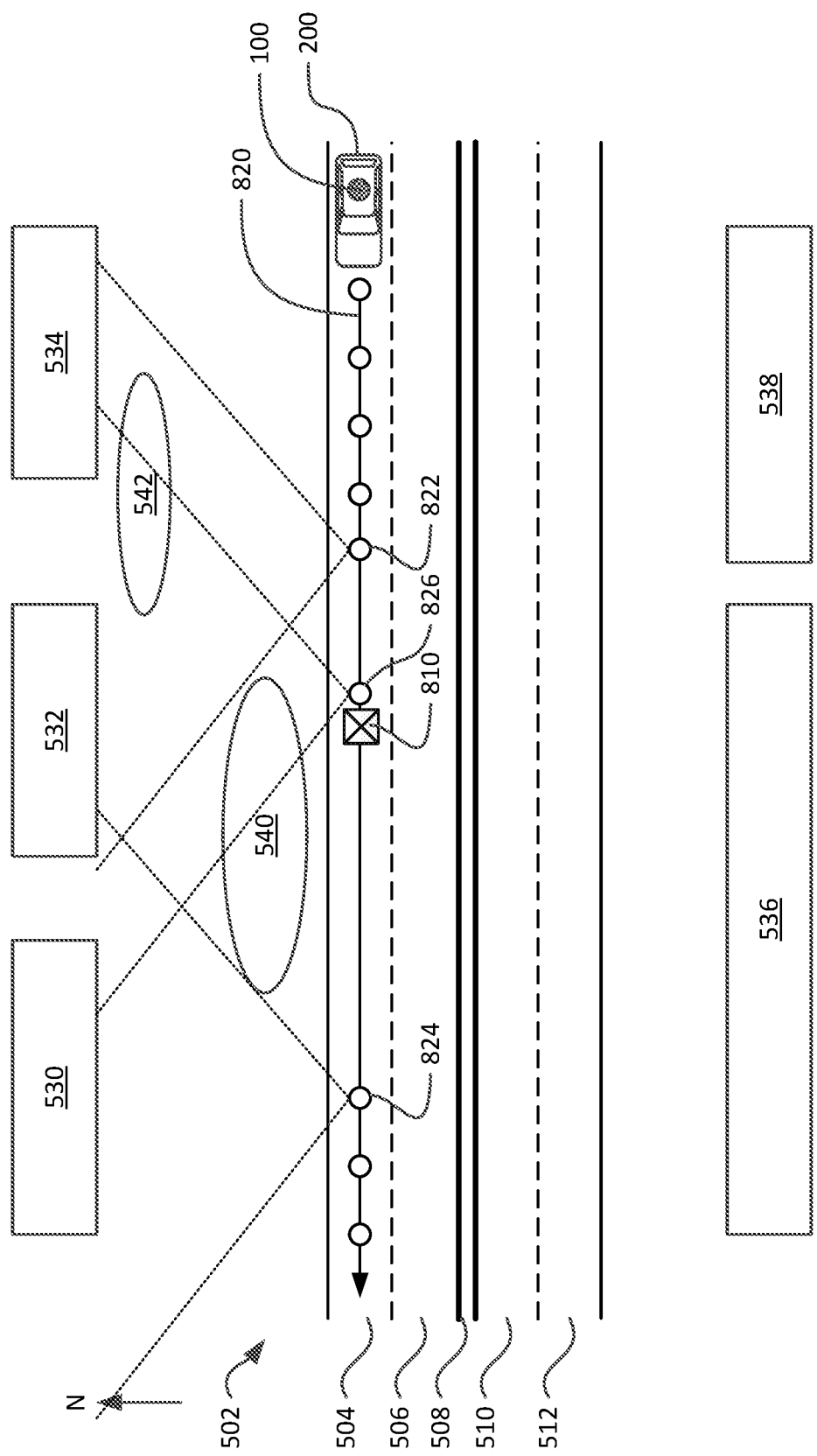
FIG. 8 is another aerial view of the geographic area 500 in accordance with aspects of the disclosure.

Other than the first trigger location 822 and second trigger location 824, set 820 may include other capture locations at regular intervals before the first trigger location and after the second trigger location. There may be no intervening capture locations, or alternatively, one or more capture locations and/or other trigger locations may be included in set 820 between the first and second trigger locations. An intervening trigger location may, for instance, be determined to avoid another occluder. As shown in FIG. 8, intervening trigger location 826 may be determined as part of set 820 in order to avoid tree 542 which also partially occludes the surface of building 532. The intervening capture locations may be spaced apart at same or similar regular intervals as the capture locations prior to the first trigger location. In the alternative, the intervening capture locations may be more spread out as less useful information would be captured on account of the occluding tree 540.

Figure 9:
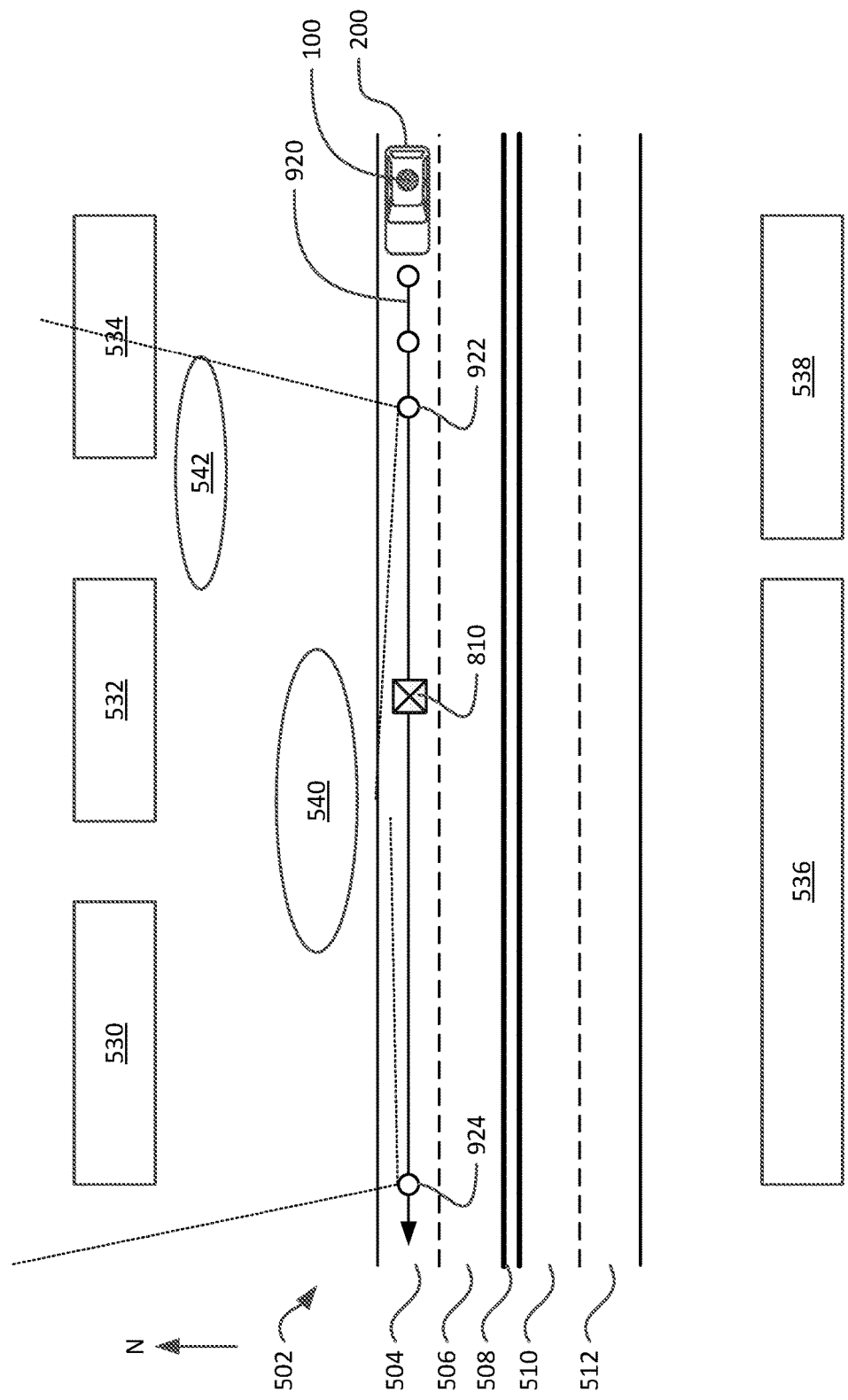
FIG. 9 is a further aerial view of the geographic area 500 in accordance with aspects of the disclosure.

In some examples, the first image sensor's pose may be adjusted, such as using a gimbal, to a first pose pointed at the business storefront from the first trigger location and a second pose pointed at the business storefront from the second trigger location, as shown in FIG. 9. When the first image sensor's pose is adjustable, the one or more computing devices 110 may determine the first trigger location based on a best angle from which the target of interest may be captured while avoiding the occluder. Rather than being pointed due north, the first image sensor may have a first pose pointing northwest from a first trigger location 922 of set 920 and a second pose pointing north east from a second trigger location 924 of set 920. In the interval between the first trigger location 922 and the second trigger location 924, the first image sensor may be moved from the first pose to the second pose. Given that the pose of the first image sensor is different, the first trigger location 922 determined to be in a different location than first trigger location 822. Similarly, the second trigger location 924 may also differ from second trigger location 824.

In some embodiments, the first trigger location 922 may be designated for use of the first image sensor, and the second trigger location 924 may be designated for the second image sensor. The first image sensor may optionally be fixed at the first pose, and the second image sensor at the second pose, or one or both sensors' poses may be adjustable.

Determining the timing characteristic may additionally or alternatively include delaying or advancing an image capture, thereby shifting the phase of the rate of capture, so that an image or location sensor collects a first image or first location data of a target of interest immediately before one side of an occluder enters the sensor's field of view and captures a second image of the target of interest immediately after the other side of the occluder leaves the sensor's field of view. For example, after determining a first trigger location and a second trigger location as described above, a first capture location of set 520 nearest to the first trigger location may be shifted to the first trigger location and a second capture location of set 520 shifted to the second trigger location. The other capture locations of set 520 may otherwise remain in the same locations. Alternatively, the phase shift of the first capture location may cause all following capture locations to shift in the same amount as the first capture location, and the subsequent phase shift of the second capture location may cause all following capture locations to shift again the same amount as the second capture location. The rate of capture of different sensors may be shifted differently for the purpose of capturing the target of interest at different angles and at different times.

Based on the determined timing, the one or more computing devices 110 of image capture system 100 may control one or more image sensors 120 or location sensors 130 in real-time. For example, when the one or more computing devices 110 detects that the image capture system 100 is at a capture location or trigger location, the one or more computing devices 110 may control the one or more image sensors 120 and one or more location sensors 130 to collect an image and location data. The one or more computing devices 110 may update the determined timing characteristic continuously, at set intervals, or when a change is detected in the characteristics of pose or motion of a sensor, target of interest or occluder.

Alternatively, instead of controlling the timing characteristic of a sensor in real-time, the one or more computing devices 110 may identify particular images or location data to be dropped or discarded based on the determined timing characteristic after the images or location data is collected and prior to further processing. By way of example, the one or more computing devices 110 may determine the timing characteristic of a first image sensor to include a plurality of times of capture that correspond with a plurality of capture locations. A subset of images from the images captured by the first image sensor may include images that were captured at or closest to the determined capture locations. The remaining images not in the subset may be dropped before they are transmitted or stored in the memory or may be discarded from the memory in post-processing.

The image capture system may additionally notify the one or more computing devices 210 of the vehicle 200 or a user regarding a sufficiency of captured images and/or locations. A message indicating that the captured images and locations are sufficient may be sent when 3D location data of the target of interest are captured a sufficient amount, such as two times or more, in the collected images and 3D location data. When the 3D location data of the target of interest are captured an insufficient amount in either the collected images or the 3D location data, such as less than twice, a message indicating that another run by the target of interest is required may be sent. For autonomous vehicles, the one or more computing devices 210 may automatically plan and execute another run past the target of interest or may do so after receiving user input requesting another run. In some examples, the one or more computing devices 110 may also annotate the surfaces or areas that were insufficiently captured and may optionally send a message regarding the annotated surfaces or areas to the one or more computing devices 210 or store the annotation in the target of interest database in memory 230 or storage system 350.

Moreover, the system may determine a focal length of each of the one or more image sensors based on the location of the target of interest. The focal length may be determined using the average distance of the target of interest from a given image sensor at a given instance. The focal length may be determined to change over time based on changes to the average distance of the target of interest from the given image sensor over time.

While the examples described above relate to an image sensor configured to capture images at a rate of capture, the same or similar determinations regarding the timing characteristic may be made with respect to a location sensor configured to collect location data. Furthermore, some or all of the methods described above may be performed by one or more computing devices 210 of vehicle 200 rather than one or more computing devices 110 of image capture system 100.

Figure 10:
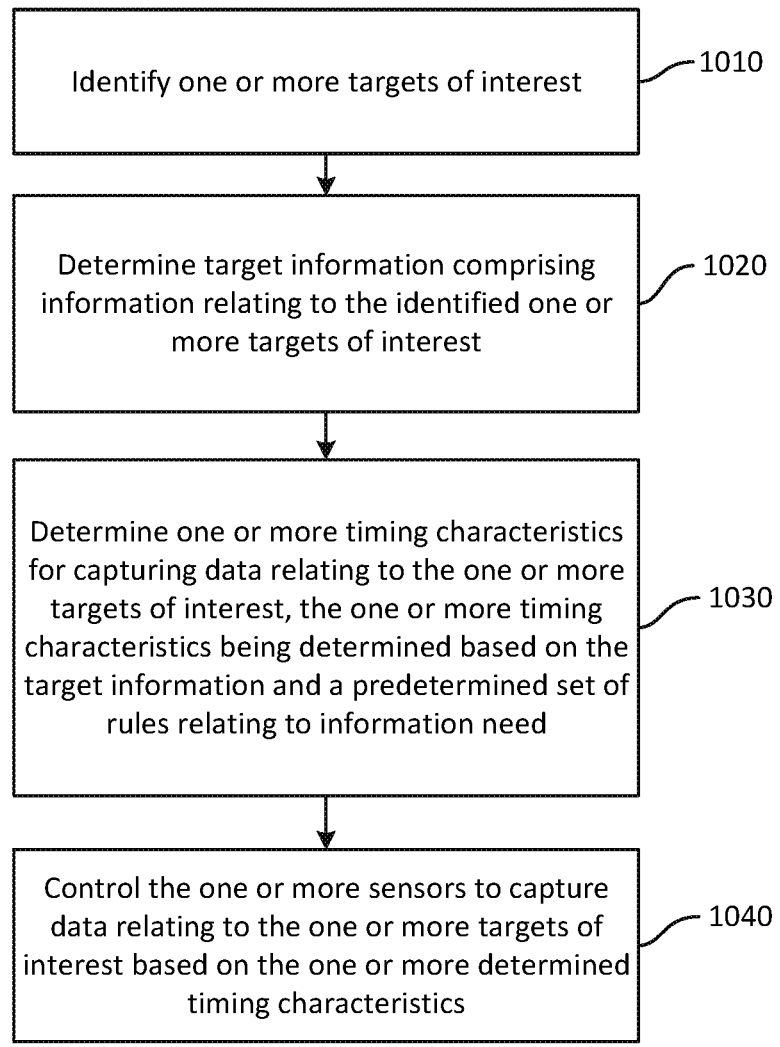
FIG. 10 is a flow diagram 1000 for a method in accordance with aspects of the disclosure.

In FIG. 10, flow diagram 1000 is shown in accordance with some of the aspects described above that may be performed by the one or more computing devices 110 of image capture system 100 and/or one or more computing devices 210 of vehicle 200. While FIG. 10 shows blocks in a particular order, the order may be varied and multiple operations may be performed simultaneously. Also, operations may be added or omitted.

At block 1010, the one or more computing devices 110 or 210 may identify one or more targets of interest. A target of interest may be, for example, a front of a building, a business storefront, a billboard, etc. At block 1020, target information that relates to the identified one or more targets of interest may be determined. Target information may include a distance between a target and a sensor or presence of an occluder that may come between the sensor and the target of interest. At block 1030, one or more timing characteristics may be determined for capturing data relating to the one or more targets of interest. The one or more timing characteristics may be determined based on the target information and a predetermined set of rules relating to information need. Example timing characteristics include rate of capture, phase shift, or trigger locations. At block 1040, the one or more computing devices 110 or 210 may control the one or more sensors to capture data relating to the one or more targets of interest based on the one or more determined timing characteristics. For example, the one or more computing devices 110 or 210 may set the rate of capture of each of the one or more sensors or may cause the one or more sensors to capture data at a determined trigger location.

Image capture system 100 may be further configured to selectively process less than all of the data collected by the image or location sensors. For instance, one or more computing devices 110 installed on the vehicle 200 may use simultaneous location and mapping ("SLAM") to generate a map or 3D model of targets of interest in real time. The map or model may be used to determine the surfaces that have been captured and the surfaces that still need to be captured. By way of example, the image capture system 100 may construct and display a simple model of a target of interest to the operator of the system in real-time so the operator may can determine whether all of the target surfaces have been captured. If there is a gap in coverage, the image capture system 100 may be moved to different positions in order to fill in the gaps and create a more complete model. This feature may be particular advantageous when the image capture system is stored on a highly-mobile vehicle, such as an unmanned aerial vehicle ("UAV", e.g., quadcopter) or a wearable device (e.g., a Street View Trekker backpack). The image capture system may be further configured to autonomously position itself to complete the model. By way of example, a UAV may be programmed to fly around a target of interest and collect image data until the model is complete. A more detailed model or additional information may be extracted from the sensed data after it is transferred to more computing devices with more memory and processing resources than those accessible by the image capture system.

Image capture system 100 may also be configured to selectively store less than all of the data collected by the image or location sensors. For example, if the system includes a machine learning component that determines only a small portion of an image is likely to be associated with a target of interest (e.g., a street sign), the one or more computing devices 110 may store the image data of the target of interest (e.g., the pixel values corresponding with a speed limit sign) and discard the other image data captured in the image. Moreover, instead of storing the image data associated with the target of interest, the system may store a smaller representation of the data (e.g., the location of the speed limit sign and the number displayed on it). Data may be discarded by not storing the data in non-volatile memory after it has been processed, storing the data in non-volatile memory and later deleting it, ignoring the data as it arrives, etc.

By way of further example, if images contain overlapping image data, the image capture system 100 may store one copy of the overlapping data and discard the rest. For instance and as noted above, the system may increase the rate of capture when a relatively close target of interest is passed at relatively high speed. The image data may capture not only the target of interest but distant targets as well and, due to parallax, the amount of overlap between images may be quite high. The one or more computing devices may thus discard the overlapping image data (e.g., pixel values of distant objects in an image) and retain the remaining image data.

The image capture system 100 may determine whether to store or discard image and location data by projecting the image data onto a 3D model. For example, if image data does not correspond with the 3D model of the target of interest described above, the image data may be discarded. If image data in a later image corresponds with a surface of the model that was already painted with data from a prior image, the image data from the later image may be discarded as well. In some embodiments, the system may retain a copy of the model and discard the image data used to generate the model once as soon as the image capture system 100 moves out of sight of the modelled surface.

Image data may also be stored or discarded based on the number of images capturing a target of interest. By way of example, the system may capture and retain a given number of images of a surface and discard subsequent images of the same surface. The system may also calculate a quality value for each image and retain the image or a given number of images with the highest quality value(s). For example, as image capture system 100 gets closer to a surface, it tends to collect more detailed image and location data. As a result, the quality value may be based on the granularity of the image data projected onto the model, e.g., the number of pixels captured per square centimeter of the relevant surface. Since captured image data tends to grow finer as the image sensor gets closer to a surface, the quality value may also be based on the sensed geographic distance from the relevant image sensor to the surface.

An image of a surface may be discarded or retained based on factors that are specific to the image data. For example, lighting conditions change depending on the time of day and day of the year. If two images of the same surface were taken under different lighting conditions, both images may be retained. Alternatively, if one of the two images was likely to have been taken during relatively poor lighting conditions, such as an image of a west-facing surface early in the morning, the image with the poor lighting conditions may be discarded.

Even if a system discards image data from a particular image, it may retain image data based on that image. For example, as images of a target of interest arrive for processing, the system may project the image data onto texels of a model of the target of interest and store a running average of the color and brightness data projected onto each texel.

The features described above allow for capturing images and location information that more efficiently and clearly captures information. Images and location information collected in the manner described above may be used to provide reconstructions of a geographic area that presents interesting areas in more detail with a minimal amount of data capture and storage. The amount of overlap of the collected images and location information as described above ensures that users have enough information with which to create reconstructions of the geographic area. Because data capture and storage may be less expensive while still capturing enough information for accurate depiction of the geographic area, a user may more easily find relevant information or view the interesting areas using the collected information. Because more relevant information is viewable, a user is more likely to return to view the reconstruction or view other reconstructions based on the collected information.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. The provision of examples (as well as clauses phrased as "such as," "e.g.", "including" and the like) should not be interpreted as limiting the claims to the specific examples; rather, the examples are intended to illustrate only some of many possible aspects. Similarly, references to "based on" and the like means "based at least in part on". Further, the same reference numbers in different drawings can identify the same or similar elements.

The invention claimed is:

1. A method of controlling one or more sensors on a moving vehicle comprising:

detecting, by one or more computing devices, a first surface at a first location and a second surface at a second location using the one or more sensors;

classifying, by the one or more computing devices, the second surface as a target of interest;

determining, by the one or more computing device, one or more timing characteristics of the one or more sensors based on a pose or motion of the one or more sensors relative to the first location of the first surface and the second location of the second surface;

controlling, by the one or more computing devices, the one or more sensors to capture data based on the determined one or more timing characteristics; and classifying, by the one or more computing devices, the first surface as an occluder in response to the first location being or will be between a location of the one or more sensors and the second location.

2. The method of claim 1, wherein determining the timing characteristic comprises:

determining a first rate of capture for capturing the first surface, based on the first location; and determining a second rate of capture for capturing the second surface, based on the second location, the second rate of capture being higher than the first rate of capture; and wherein controlling the one or more sensors to capture data comprises controlling a first sensor of the one or more sensors to capture a first dataset relating to the first surface at the first rate of capture, and controlling a second sensor of the one or more sensors to capture a second dataset relating to the second surface at the second rate of capture.

3. The method of claim 1, wherein determining the one or more timing characteristics for capturing data comprises determining one or more trigger locations at which data should be captured by the one or more sensors so that at least part of the occluder is not captured by the one or more sensors; and wherein controlling the one or more sensors to capture data comprises controlling the one or more sensors to capture data according to the determined one or more trigger locations.

4. The method of claim 1, wherein the one or more timing characteristics are also determined based on a speed of the moving vehicle.

5. The method of claim 1, wherein the one or more sensors comprise an image sensor.

6. The method of claim 1, wherein the one or more sensors comprise a location sensor configured to capture three-dimensional location data.

7. The method of claim 1, further comprising:

determining, by the one or more computing devices, whether data relating to the target of interest was captured a designated amount of times in the captured data; and sending, by the one or more computing devices, a message indicating more data relating to the target of interest is needed.

8. A system comprising:

one or more sensors for capturing visual data, location data, or both; and one or more computing devices; and a memory comprising computer-readable instructions, which when executed by the one or more computing devices, cause the one or more computing devices to:

detect, using the one or more sensors, a first surface at a first location and a second surface at a second location;
classify the second surface as a target of interest;
determine one or more timing characteristics of the one or more sensors based on a pose or motion of the one or more sensors relative to the first location of the first surface and the second location of the second surface;
control the one or more sensors to capture data based on the determined one or more timing characteristics; and
classify the first surface as an occluder in response to the first location being or will be between a location of the one or more sensors and the second location.

9. The system of claim 8, wherein the one or more timing characteristics are determined by:
determining a first rate of capture for capturing the first surface based on the first location; and
determining a second rate of capture for capturing the second surface, based on the second location, the second rate of capture being higher than the first rate of capture; and
wherein a first sensor of the one or more sensors is controlled to capture a first dataset relating to the first surface at the first rate of capture, and a second sensor of the one or more sensors is controlled to capture a second dataset relating to the second surface at the second rate of capture.

10. The system of claim 8,
wherein the one or more timing characteristics are determined by determining one or more trigger locations at which data should be captured by the one or more sensors so that at least part of the occluder is not captured by the one or more sensors; and
wherein the one or more sensors are controlled to capture data by controlling the one or more sensors to capture data according to the determined one or more trigger locations.

11. The system of claim 8, wherein the one or more sensors are mounted on a vehicle, and the one or more timing characteristics are also determined based on a speed of the vehicle.

12. The system of claim 8, wherein the one or more sensors comprise an image sensor.

13. The system of claim 8, wherein the one or more sensors comprise a location sensor configured to capture three-dimensional location data.

14. The system of claim 8, wherein, when executing the computer-readable instructions, the one or more computing devices are further caused to:
determine whether data relating to the target of interest was captured a designated amount of times in the captured data; and
send a message indicating more data relating to the target of interest is needed.

15. The system of claim 8, further comprising a vehicle, wherein the one or more sensors are mounted on the vehicle.

16. A non-transitory, tangible computer-readable storage medium on which computer readable instructions of a program are stored, the instructions, when executed by one or more computing devices, cause the one or more computing devices to perform a method, the method comprising:
detecting a first surface at a first location and a second surface at a second location using one or more sensors;
classifying the second surface as a target of interest;
determining one or more timing characteristics of the one or more sensors based on a pose or motion of the one or more sensors relative to the first location of the first surface and the second location of the second surface;
controlling the one or more sensors to capture databased on the determined one or more timing characteristics; and
classifying the first surface as an occluder in response to the first location being or will be between a location of the one or more sensors and the second location.

17. The medium of claim 16, wherein determining the timing characteristic comprises:
determining a first rate of capture for capturing the first surface based on the first location; and
determining a second rate of capture for capturing the second surface based on the second location, the second rate of capture being higher than the first rate of capture; and
wherein controlling the one or more sensors to capture data comprises controlling a first sensor of the one or more sensors to capture a first dataset relating to the first surface at the first rate of capture, and controlling a second sensor of the one or more sensors to capture a second dataset relating to the second surface at the second rate of capture.

18. The medium of claim 16,
wherein determining the one or more timing characteristics for capturing data comprises determining one or more trigger locations at which data should be captured by the one or more sensors so that at least part of the occluder is not captured by the one or more sensors; and
wherein controlling the one or more sensors to capture data comprises controlling the one or more sensors to capture data according to the determined one or more trigger locations.

19. The medium of claim 16, wherein the one or more sensors are mounted on a vehicle, and the one or more timing characteristics are also determined based on a speed of the vehicle.

20. The medium of claim 16, wherein the method further comprises:
determining whether data relating to the target of interest was captured a designated amount of times in the captured data; and
sending a message indicating more data relating to the target of interest is needed.

* * * * *